(12) United States Patent
Anderson

(10) Patent No.: US 9,380,795 B1
(45) Date of Patent: Jul. 5, 2016

(54) FISH SCALING SYSTEMS

(71) Applicant: Pauline Anderson, Brockton, MA (US)

(72) Inventor: Pauline Anderson, Brockton, MA (US)

(*) Notice: Subject to any disclaimer, the term of this patent is extended or adjusted under 35 U.S.C. 154(b) by 0 days.

(21) Appl. No.: 14/857,807

(22) Filed: Sep. 17, 2015

Related U.S. Application Data

(60) Provisional application No. 62/052,781, filed on Sep. 19, 2014.

(51) Int. Cl.
*A22C 25/00* (2006.01)
*A22C 25/02* (2006.01)
*A45F 3/00* (2006.01)

(52) U.S. Cl.
CPC ............... *A22C 25/025* (2013.01); *A45F 3/00* (2013.01)

(58) Field of Classification Search
CPC ........ A22C 25/00; A22C 25/06; A22C 25/02; A22C 25/025; A22C 25/17; A01K 13/00; A01K 13/02
USPC .............. 452/1, 5, 12, 17, 102–105; 119/600, 119/625, 630–632
See application file for complete search history.

(56) References Cited

U.S. PATENT DOCUMENTS

| | | | | |
|---|---|---|---|---|
| 484,849 A * | 10/1892 | Decker | ................... | B26B 19/24 119/617 |
| 627,806 A * | 6/1899 | Earl | ....................... | A47L 13/08 119/631 |
| 1,529,062 A * | 3/1925 | Gruenhagen | ........ | A22C 25/025 452/105 |
| 1,997,339 A * | 4/1935 | Olson | .................. | A22C 25/025 452/105 |
| 2,179,758 A | 11/1939 | Schlueter | | |
| 2,538,435 A * | 1/1951 | Wegner | ................ | A22C 25/025 15/145 |
| 2,618,011 A * | 11/1952 | Wunderlich | ......... | A22C 25/025 119/631 |
| 2,746,082 A * | 5/1956 | Renner | ................ | A22C 25/025 452/105 |
| 3,127,634 A * | 4/1964 | Ferguson | ............. | A22C 25/025 452/105 |
| 5,655,482 A * | 8/1997 | Lundquist | .............. | A45D 24/02 119/625 |
| 8,172,651 B1 * | 5/2012 | Trahan | ................. | A22C 25/025 452/105 |

* cited by examiner

*Primary Examiner* — Richard Price, Jr.
(74) *Attorney, Agent, or Firm* — RG Patent Consulting, LLC; Rachel Gilboy

(57) ABSTRACT

The fish scaling system is a device having an elongated body with a first side and a second side and a proximate end and a distal end. The proximate end forms a handle and the distal end has three large circular serrated scrapers on the first side and three small circular serrated scrapers on the second side for removing scales from a fish. The large and small circular scrapers are replaceable when they become worn.

19 Claims, 5 Drawing Sheets

FISH SCALING SYSTEMS

CROSS-REFERENCE TO RELATED APPLICATION

The present application is related to and claims priority from prior provisional application Ser. No. 62/052,781, filed Sep. 19, 2015 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of fish scalers and more specifically relates to a fish scaling system.

2. Description of the Related Art

Fishing is a favorite pastime that families often structure recreational outings around. The fish caught during an outing will get cleaned and then eaten for dinner or put into a freezer for meals later on. Fish is not only a favorite meal for many people, fish is generally considered to be a healthy meat that is a rich source of Omega3s. Fishing is done both commercially and privately and taken to the market for sale or taken home. Most of the fish caught have scales which have to be removed during the cleaning process. Scaling fish is quite often an unpleasant job. There are several methods that people use to clean fish but all methods use some kind of tool. Knives are used for removing scales most of the time and sometimes the knife blades have a serrated edge which helps in catching the edge of the scales when the blade is placed at a high angle and scraped against the scales. When scaling fish, usually the same spot must be scraped several times in order to remove all of the scales in that spot, and when the scales are removed in that spot, it is time to move to a new spot that has not yet been cleaned. A fish scaler that is able to make one pass the equivalent of 2 or 3 would be welcomed.

Various attempts have been made to solve the above-mentioned problems such as those found in U.S. Pat. No. 2,538,435 to Wegner Halwin C, U.S. Pat. No. 1,997,339 to Olson Harry A, and U.S. Pat. No. 2,179,758 to Schlueter Arthur J. This art is representative of fish scalers. None of the above inventions and patents, taken either singly or in combination, is seen to describe the invention as claimed.

Ideally, a fish scaler should provide efficiency and ease of use, and, yet would operate reliably and be manufactured at a modest expense. Thus, a need exists for a reliable fish scaling system to avoid the above-mentioned problems.

BRIEF SUMMARY OF THE INVENTION

In view of the foregoing disadvantages inherent in the known fish scaler device art, the present invention provides a novel fish scaling system. The general purpose of the present invention, which will be described subsequently in greater detail, is to provide a fish scaling system that quickly and easily removes fish scales with fewer passes.

The fish scaling system is a hand tool having scraping blades on two sides for scaling fish of various sizes. The scraping blades are larger on one side than on the other side and are for scaling bigger fish while the smaller scraping blades on the other side are for use with smaller fish. The fish scaling system preferably comprises an elongated body having a proximate end and a distal end and a first side and a second side, a plurality of first fish scalers removably coupled to a corresponding plurality of first fish scaler receivers located on the first side at the distal end of the elongated body, and a plurality of second fish scalers removably coupled to a plurality of second fish scaler receivers located on the second side at the distal end of the elongated body. The first and second fish scaler receivers couple to the first and second fish scalers to hold the scraping blades to the elongated body.

The elongated body with the first fish scaler receivers having the first fish scalers coupled thereto, and the second fish scaler receivers having the second fish scalers coupled thereto, is useful for quickly and efficiently removing the scales of either a large fish or a small fish to be cleaned. The first fish scalers are greater in diameter than the second fish scalers and the first fish scalers and the second fish scalers each comprise a circular scraping edge that is serrated. Also, the first fish scalers and the second fish scalers each have a coupling side and a scaling side with the scaling side being larger in diameter than the coupling side. The coupling side is more circular than the scraping side so it can be inserted into the circular shaped first and second fish scaler receivers and locked with a twisting motion. The first fish scalers are deposed in a triangular pattern on the first side of the elongated body when coupled to the first fish scaler receivers and the second fish scalers are deposed in a triangular pattern on the second side when coupled to the second fish scaler receivers. The first fish scalers and the second fish scalers each include a twist-lock on the coupling side for coupling with the first fish scaler receivers and the second fish scaler receivers. The first fish scalers and the second fish scalers are preferably constructed of aluminum and are individually replaceable when the circular scraping edge becomes worn. The first fish scaler receivers and the second fish scaler receivers preferably comprise a cylindrical shape and have an inner circumference that is sized to have a friction fit with the outer circumference of the coupling side of both the first and second fish scalers.

The elongated body is approximately 12 inches in length and approximately 1 inch in width and is constructed of plastic with an internal void that is filled with a buoyant material such that the elongated body is buoyant if accidentally dropped in water. The proximate end of the elongated body forms a handle that includes a rubberized grip. The handle is greater in circumference than the distal end and is rounded at the proximate end. The fish scaling system is designed for grasping the handle of the proximate end of the elongated body and scraping the first fish scalers back and forth against the side of a large fish to remove the scales from the fish and alternately for grasping the handle of the proximate end of the elongated body and scraping the second fish scalers back and forth against the side of a small fish to remove the scales from the small fish. Of course, either the first or the second fish scalers can be used on any size of fish as preferred by the user depending on the size of scales of the fish.

The fish scaling system may be offered as a kit that includes an elongated body of the fish scaling system and a plurality of first fish scalers and a plurality of second fish scalers that may be used as replacement circular scraping blades when the attached circular scraping blades become worn. The kit may also include a belt sheath for handy carrying when at a fishing location.

A method of using the fish scaling system may include the steps of turning the handle of the elongated body with the first side facing downward, scraping the first fish scalers against the sides of a large fish to remove the scales, turning the handle of the elongated body with the second side facing downward, scraping the second fish scalers against the sides of a small fish to remove the scales, cleaning the fish scaling system, and storing the fish scaling system.

The present invention holds significant improvements and serves as a fish scaling system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, fish scaling system, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a fish scaler and more particularly to a fish scaling system as used to improve the efficiency and convenience of scaling fish.

Generally speaking, a fish scaling system is a device having an elongated body with a first side and a second side and a proximate end and a distal end. The proximate end forms a handle and the distal end has three large circular serrated scrapers on the first side and three small circular serrated scrapers on the second side for removing scales from a fish. The large and small circular scrapers are replaceable when they become worn.

Figure 1:
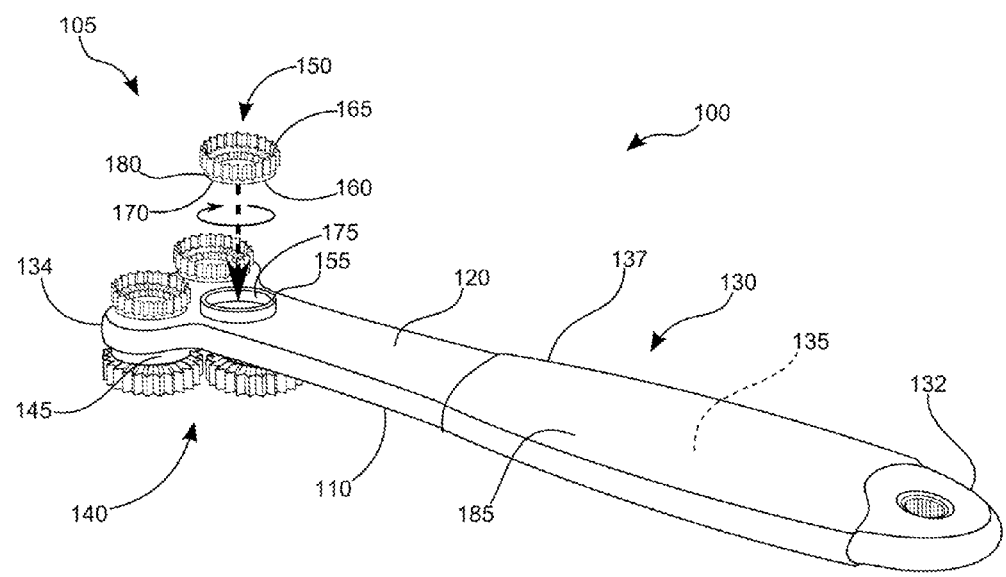
FIG. 1 shows a perspective view illustrating a fish scaling system according to an embodiment of the present invention.

Referring to the drawings by numerals of reference there is shown in FIG. 1, a perspective view illustrating fish scaling system 100 according to an embodiment of the present invention.

Fish scaling system 100 is a hand tool having circular scraping blades 105 on two sides for scaling fish of various sizes. Circular scraping blades 105 are larger on first side 110 than on second side 120 and are generally for scaling bigger fish while the smaller circular scraping blades 105 on second side 120 are for use in scaling smaller fish. Fish scaling system 100 preferably comprises elongated body 130 having proximate end 132 and distal end 134 and first side 110 and second side 120, a plurality of first fish scalers 140 removably coupled to a corresponding plurality of first fish scaler receivers 145 located on first side 110 at distal end 134 of elongated body 130, and a plurality of second fish scalers are 150 removably coupled to the plurality of second fish scaler receivers 155 located on second side 120 at distal end 134 of elongated body 130.

Figure 2:
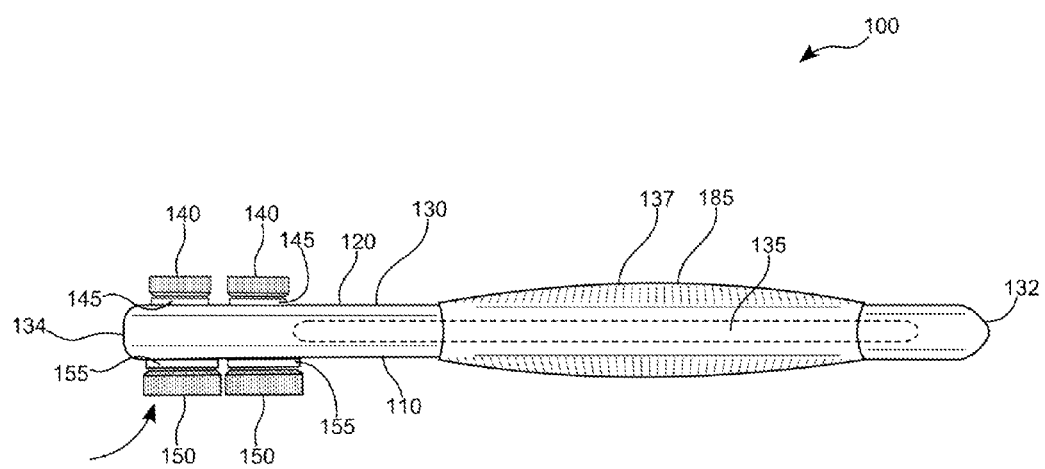
FIG. 2 is a side elevation view illustrating a fish scaling system according to an embodiment of the present invention of FIG. 1.

Referring now to FIG. 2, a side elevation view illustrating fish scaling system 100 according to an embodiment of the present invention of FIG. 1.

Elongated body 130 with first fish scaler receivers 145 having first fish scalers 140 coupled thereto, and second fish scaler receivers 155 having second fish scalers 150 coupled thereto, is useful for quickly and efficiently removing scales of either a large fish or a small fish to be cleaned. Of course, either first 140 or second fish scalers 150 can be used on any size of fish depending on the scale size of the fish. First fish scalers 140 are greater in diameter than second fish scalers 150 and first fish scalers 140 and second fish scalers 150 each comprise circular scraping blades 105 that are serrated. Also, first fish scalers 140 and second fish scalers 150 each have coupling side 160 and scaling side 165 with scaling side 165 being larger in diameter than coupling side 160. Coupling side 160 is more circular than scaling side 165 so it can be inserted into the circular shaped first 145 and second fish scaler receivers 155 and locked with a twisting motion. First fish scalers 140 are deposed in a triangular pattern on first side 110 of elongated body 130 when coupled to first fish scaler receivers 145 and second fish scalers 150 are deposed in a triangular pattern on second side 120 when coupled to second fish scalers 150 receivers. First fish scalers 140 and second fish scalers 150 each may include a twist-lock 170 on coupling side 160 for coupling with first fish scaler receivers 145 and second fish scaler receivers 155. First fish scalers 140 and second fish scalers 150 are preferably constructed of aluminum and are individually replaceable when circular scraping blades 105 become worn. First fish scaler receivers 145 and second fish scaler receivers 155 preferably comprise a cylindrical shape and have an inner circumference 175 that is sized to have a friction fit with outer circumference 180 of coupling side 160 of both first fish scalers 140 and second fish scalers 150.

Figure 3:
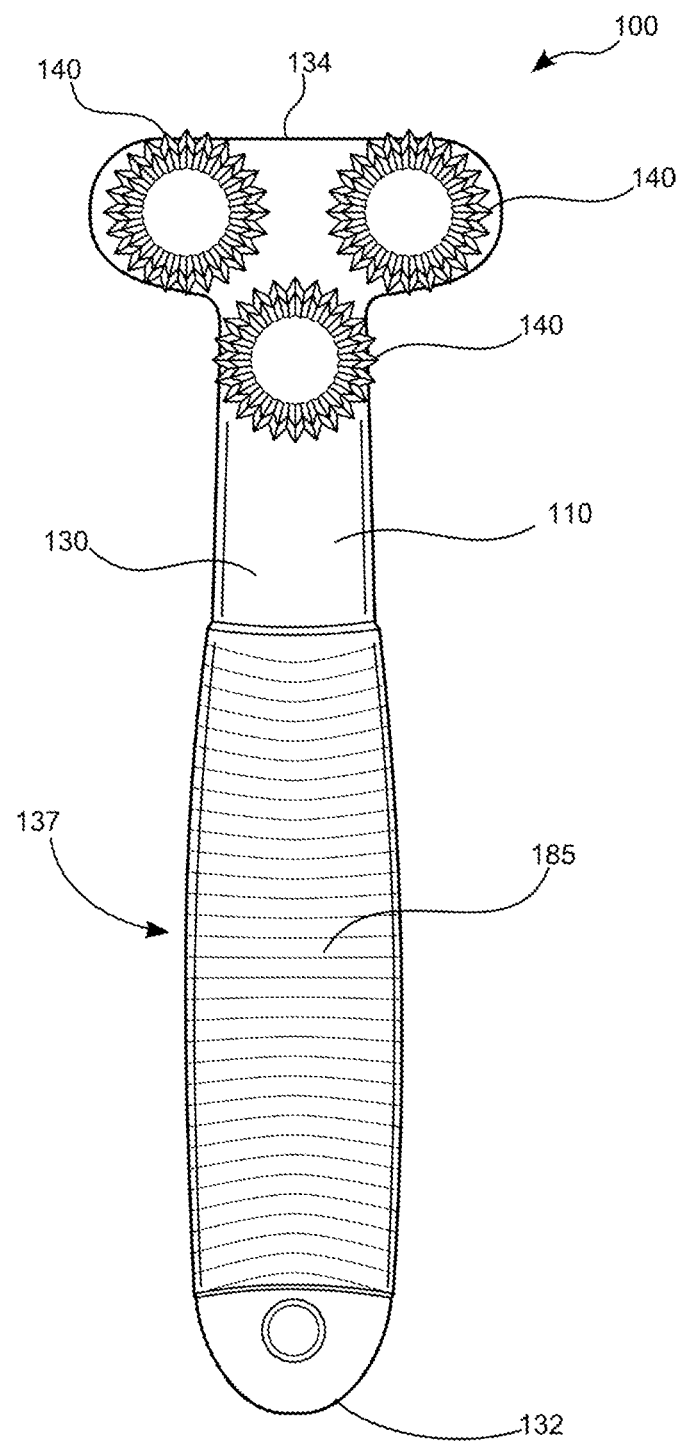
FIG. 3 is a top view illustrating fish scaling system according to an embodiment of the present invention of FIG. 1.

Referring now to FIG. 3, a top view illustrating fish scaling system 100 according to an embodiment of the present invention of FIG. 1.

Elongated body 130 is approximately 12 inches in length and approximately 1 inch in width and is constructed of plastic with internal void 135 that is filled with a buoyant material such that elongated body 130 is buoyant if accidentally dropped in water. Proximate end 132 of elongated body 130 forms handle 137 that includes rubberized grip 185. Handle 137 is greater in circumference than distal end 134 and is rounded at proximate end 132 while distal end 134 has somewhat of a T-shape to accommodate the triangular pattern of the placement of first 140 and second fish scalers 150. Fish scaling system 100 is designed for grasping handle 137 of proximate end 132 of elongated body 130 and scraping first fish scalers 140 back and forth against the side of a large fish to remove scales from the fish and alternately for grasping handle 137 of proximate end 132 of elongated body 130 and scraping second fish scalers 150 back and forth against the side of a small fish to remove scales from the small fish.

Figure 4:
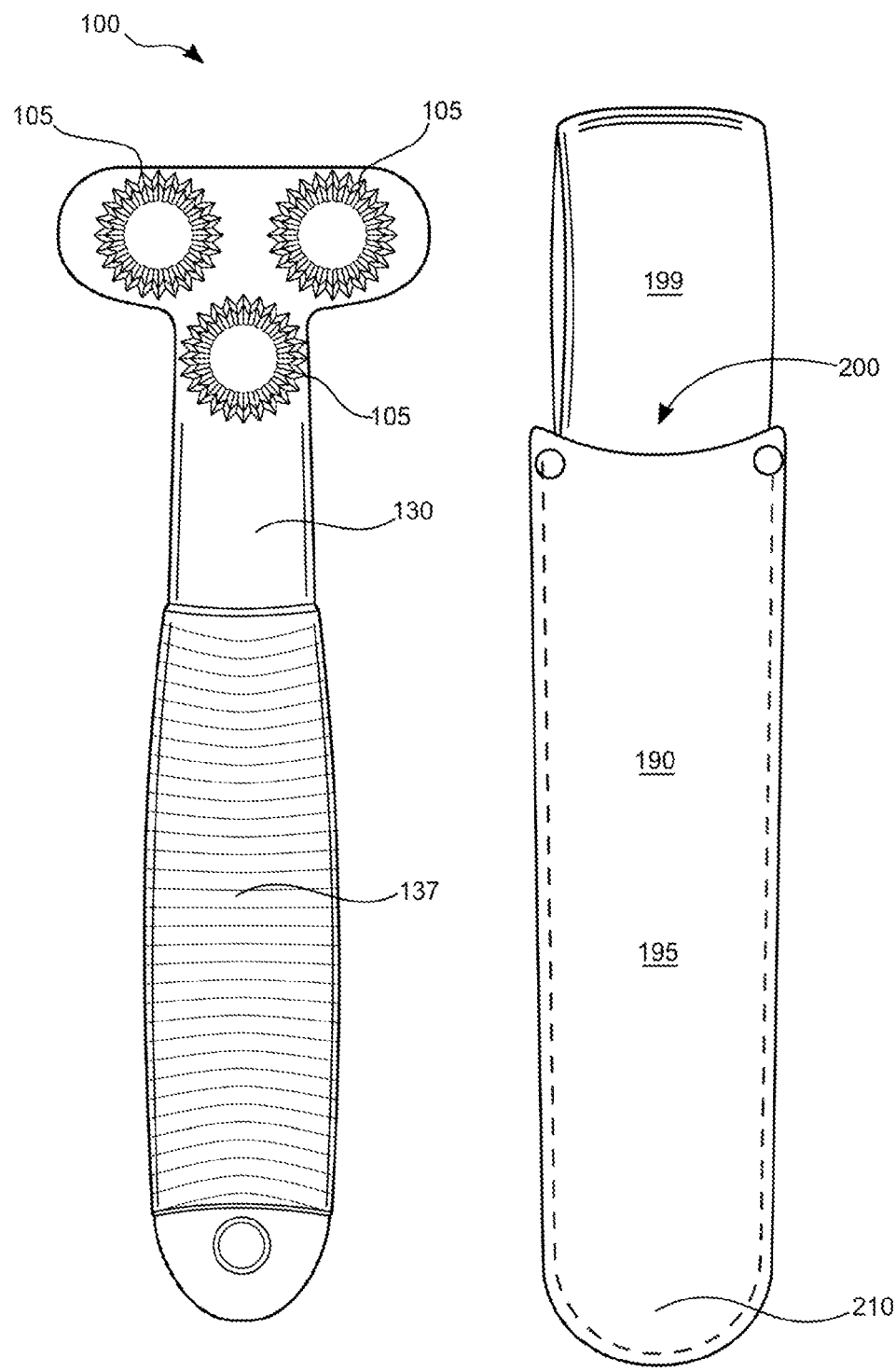
FIG. 4 is a bottom view illustrating the combination of a fish scaling system and a belt sheath according to an embodiment of the present invention of FIG. 1.

Referring now to FIG. 4, a top view illustrating the combination of fish scaling system 100 and belt sheath 190 according to an embodiment of the present invention.

A combination of fish scaling system 100 and belt sheath 190 preferably comprises fish scaling system 100 having elongated body 130 with proximate end 132 and distal end 134, first side 110 and second side 120, a plurality of first fish scalers 140 removably coupled to a plurality of first fish scaler receivers 145 located on first side 110 at distal end 134 of elongated body 130, and a plurality of second fish scalers 150 removably coupled to a plurality of second fish scaler receivers 155 located on second side 120 at distal end 134 of elongated body 130, and belt sheath 190 forming scaler encasement 195 having belt loop 199, insertion end 200, and enclosed end 210. Elongated body 130 with first fish scaler receivers 145 with first fish scalers 140 coupled thereto, and second fish scaler receivers 155 having second fish scalers 150 coupled thereto is useful for quickly and efficiently removing scales of a fish to be cleaned. Fish scaling system 100 may be conveniently stored within scaler encasement 195 for convenient carrying to a location of use and for storage between uses.

Fish scaling system 100 may be sold as kit 450 comprising the following parts: at least one fish scaling system 100; at least one belt sheath 190; at least one set of first fish scalers 140; at least one set of second fish scalers 150; and at least one set of user instructions. The kit has instructions such that functional relationships are detailed in relation to the structure of the invention (such that the invention can be used, maintained, or the like in a preferred manner). Fish scaling system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
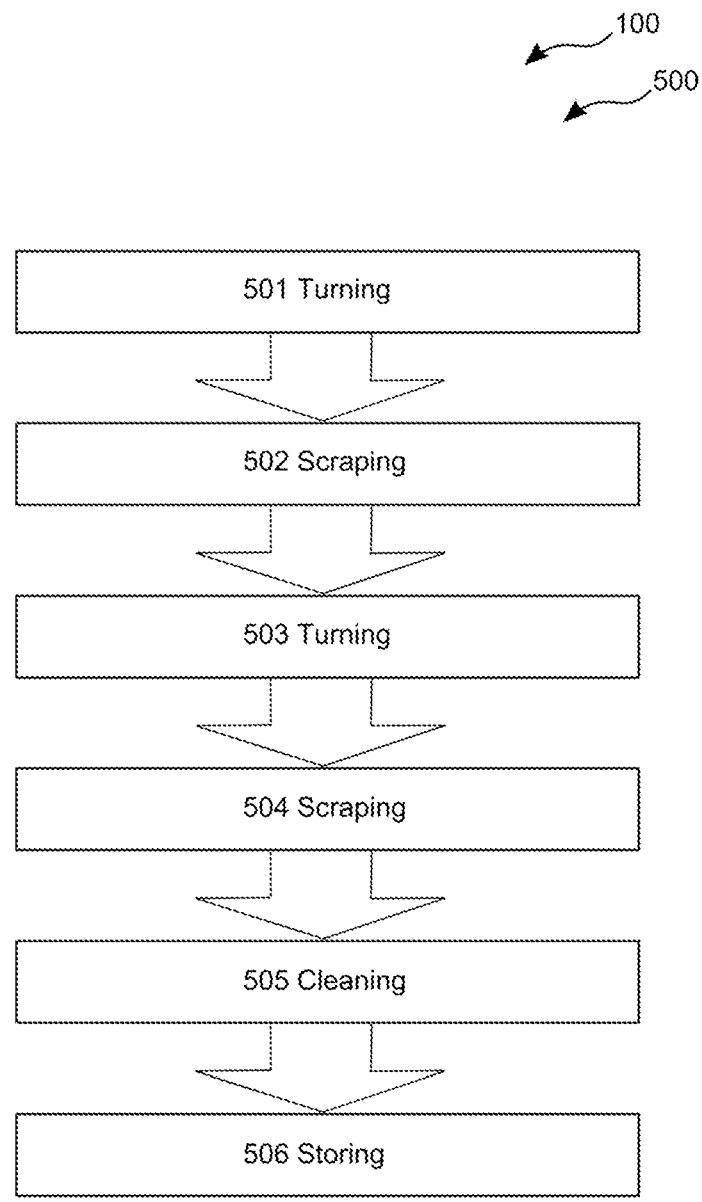
FIG. 5 is a flowchart illustrating a method of use for fish scaling system according to an embodiment of the present invention of FIGS. 1-4.

Referring now to FIG. 5, showing method of use 500 for fish scaling system 100. A method of using fish scaling system 100 may comprise the steps of step one 501 turning handle 137 of elongated body 130 with first side 110 facing downward; step two 502 scraping first fish scalers 140 against the sides of a large fish to remove the scales; step three 503 turning handle 137 of elongated body 130 with second side 120 facing downward; step four 504 scraping second fish scalers 150 against the sides of a small fish to remove the scales; step five 505 cleaning fish scaling system 100; and step six 506 and storing fish scaling system 100.

It should be noted that steps 502-504 are optional steps and may not be implemented in all cases. Optional steps of method 500 are illustrated using dotted lines in FIG. 5 so as to distinguish them from the other steps of method 500.

It should be noted that the steps described in the method of use can be carried out in many different orders according to user preference. The use of "step of" should not be interpreted as "step for", in the claims herein and is not intended to invoke the provisions of 35 U.S.C. §112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A fish scaling system comprising:
    an elongated body having a proximate end and a distal end and a first side and a second side;
    a plurality of first fish scalers removably coupled to a plurality of first fish scaler receivers located on said first side at said distal end of said elongated body;
    a plurality of second fish scalers removably coupled to a plurality of second fish scaler receivers located on said second side at said distal end of said elongated body;
    wherein said elongated body having said plurality of first fish scaler receivers having said plurality of first fish scalers coupled thereto, and said plurality of second fish scaler receivers having said plurality of second fish scalers coupled thereto is useful for quickly and efficiently removing scales of a fish to be cleaned; and
    wherein said plurality of first fish scalers are deposed in a triangular pattern on said first side when coupled to said plurality of first fish scaler receivers.

2. The fish scaling system of claim 1 wherein said plurality of first fish scalers and said plurality of second fish scalers each comprise a circular scraping edge.

3. The fish scaling system of claim 2 wherein said circular scraping edge of said plurality of first fish scalers and said plurality of second fish scalers are serrated.

4. The fish scaling system of claim 1 wherein said plurality of first fish scalers are each greater in diameter than said plurality of second fish scalers.

5. The fish scaling system of claim 4 wherein said plurality of first fish scalers and said plurality of second fish scalers each have a coupling side and a scaling side wherein each said scaling side is larger in diameter than each respective said coupling side.

6. The fish scaling system of claim 5 wherein said plurality of first fish scalers and said plurality of second fish scalers each include a twist-lock on said coupling side for coupling with said plurality of first fish scaler receivers and said plurality of second fish scaler receivers.

7. The fish scaling system of claim 1 wherein said plurality of first fish scaler receivers and said plurality of second fish scaler receivers comprise a cylindrical shape.

8. The fish scaling system of claim 7 wherein each said plurality of first fish scaler receivers and each said plurality of second fish scaler receivers have an inner circumferential wall that is sized to create a friction fit with an outer circumferential wall of respective coupling sides of each said plurality of first fish scalers and each said plurality of second fish scalers.

9. The fish scaling system of claim 1 wherein said elongated body is approximately 12 inches in length and approximately 1 inch in width.

10. The fish scaling system of claim 9 wherein said elongated body is constructed of plastic with an internal void that is filled with a buoyant material such that said elongated body is buoyant in water.

11. The fish scaling system of claim 1 wherein said proximate end of said elongated body forms a handle.

12. The fish scaling system of claim 11 wherein said handle includes a rubberized grip.

13. The fish scaling system of claim 11 wherein said handle is greater in width than said distal end and is and comprises an elliptical cross-section.

14. The fish scaling system of claim 1 wherein said plurality of second fish scalers are deposed in a triangular pattern on said second side when coupled to said plurality of second fish scaler receivers.

15. The fish scaling system of claim 1 wherein said plurality of first fish scalers and said plurality of second fish scalers are individually replaceable when a circular scraping edge becomes worn.

16. The fish scaling system of claim 1 wherein said plurality of first fish scalers and said plurality of second fish scalers are constructed of aluminum.

17. The combination of a fish scaling system and a belt sheath comprising:
  (a) a fish scaling system comprising:
    an elongated body having a proximate end and a distal end and a first side and a second side;
    a plurality of first fish scalers removably coupled to a plurality of first fish scaler receivers located on said first side at said distal end of said elongated body;
    a plurality of second fish scalers removably coupled to a plurality of second fish scaler receivers located on said second side at said distal end of said elongated body;
  wherein said elongated body having said plurality of first fish scaler receivers having said plurality of first fish scalers coupled thereto, and said plurality of second fish scaler receivers having said plurality of second fish scalers coupled thereto is useful for quickly and efficiently removing a scales of a fish to be cleaned; and
  wherein said plurality of first fish scalers are deposed in a triangular pattern on said first side when coupled to said plurality of first fish scaler receivers; and
  (b) a belt sheath comprising:
    a scaler encasement having;
    a belt loop;
    an insertion end; and
    an enclosed end; and
  wherein said fish scaling system is removably stored within said scaler encasement for convenient carrying to a location of use.

18. A fish scaling system comprising:
  an elongated body having a proximate end and a distal end and a first side and a second side;
  a plurality of first fish scalers removably coupled to a plurality of first fish scaler receivers located on said first side at said distal end of said elongated body;
  a plurality of second fish scalers removably coupled to a plurality of second fish scaler receivers located on said second side at said distal end of said elongated body; and
  wherein said elongated body having said plurality of first fish scaler receivers having said plurality of first fish scalers coupled thereto, and said plurality of second fish scaler receivers having said plurality of second fish scalers coupled thereto is useful for quickly and efficiently removing a scales of a fish to be cleaned;
  wherein said plurality of first fish scalers and said plurality of second fish scalers each comprise a circular scraping edge;
  wherein said circular scraping edge of said plurality of first fish scalers and said plurality of second fish scalers are serrated;
  wherein said plurality of first fish scalers is greater in diameter than said plurality of second fish scalers;
  wherein said plurality of first fish scalers and said plurality of second fish scalers each have a coupling side and a scaling side wherein said scaling side is larger in diameter than said coupling side;
  wherein said plurality of first fish scalers are deposed in a triangular pattern on said first side when coupled to said plurality of first fish scaler receivers;
  wherein said plurality of second fish scalers are deposed in a triangular pattern on said second side when coupled to said plurality of second fish scaler receivers;
  wherein said plurality of first fish scalers and said plurality of second fish scalers each include a twist-lock on said coupling side for coupling with said plurality of first fish scaler receivers and said plurality of second fish scaler receivers;
  wherein said plurality of first fish scalers and said plurality of second fish scalers are individually replaceable when said circular scraping edge becomes worn;
  wherein said plurality of first fish scalers and said plurality of second fish scalers are constructed of aluminum;
  wherein said plurality of first fish scaler receivers and said plurality of second fish scaler receivers comprise a cylindrical shape;
  wherein said plurality of first fish scaler receivers and said plurality of second fish scaler receivers have an inner circumference that is sized to have a friction fit with an outer circumference of said coupling side of said plurality of first fish scalers and said plurality of second fish scalers;
  wherein said elongated body is approximately 12 inches in length and approximately 1 inch in width;
  wherein said elongated body is constructed of plastic with an internal void that is filled with a buoyant material such that said elongated body is buoyant in water;
  wherein said proximate end of said elongated body forms a handle;
  wherein said handle includes a rubberized grip;
  wherein said fish scaling system includes a belt sheath;
  wherein said handle is greater in circumference than said distal end and is rounded at said proximate end; and
  wherein said fish scaling system is designed for grasping said handle of said proximate end of said elongated body and scraping said plurality of first fish scalers back and forth against a side of a small said fish to remove said scales from said fish and alternately for grasping said handle of said proximate end of said elongated body and scraping said plurality of second fish scalers back and forth against a side of a large said fish to remove said scales from said fish.

19. The fish scaling system of claim 18 further comprising a kit including:
  at least one elongated body having a handle and a plurality of first fish scaler receivers and a plurality of second fish scaler receivers;
  a plurality of first fish scalers and a plurality of second fish scalers;
  at least one belt sheath; and
  at least one set of user instructions.

* * * * *